(12) United States Patent
Chang

(10) Patent No.: US 11,199,762 B2
(45) Date of Patent: Dec. 14, 2021

(54) WAVELENGTH CONVERSION ELEMENT HAVING ANTI-REFLECTIVE LAYER WITH PORES AND MANUFACTURING METHOD THEREOF

(71) Applicant: Coretronic Corporation, Hsin-Chu (TW)

(72) Inventor: Kuo-Chou Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/861,235

(22) Filed: Apr. 29, 2020

(65) Prior Publication Data

US 2020/0355850 A1 Nov. 12, 2020

(30) Foreign Application Priority Data

May 9, 2019 (CN) .......................... 201910383324.0

(51) Int. Cl.
 G03B 21/20 (2006.01)
 G02B 1/118 (2015.01)
 G02B 1/11 (2015.01)
 G02B 5/02 (2006.01)

(52) U.S. Cl.
 CPC .............. G03B 21/204 (2013.01); G02B 1/11 (2013.01); G02B 1/118 (2013.01); G02B 5/0247 (2013.01)

(58) Field of Classification Search
 CPC ........ G03B 21/204; G02B 1/118; G02B 1/11; G02B 2207/107; G02B 5/0247
 See application file for complete search history.

(56) References Cited

U.S. PATENT DOCUMENTS

| | | | |
|---|---|---|---|
| 7,132,136 B2 * | 11/2006 | Laney | G02B 5/0247 428/1.1 |
| 7,327,415 B2 * | 2/2008 | Brickey | G02B 5/0242 349/112 |
| 8,981,630 B2 * | 3/2015 | Shikata | G02B 5/0247 313/46 |
| 9,180,486 B2 * | 11/2015 | Sun | G02B 1/111 |
| 10,437,042 B2 * | 10/2019 | Sprague | F21V 7/30 |
| 10,871,644 B2 * | 12/2020 | Sprague | C09K 11/025 |
| 2003/0118807 A1 * | 6/2003 | Laney | G02B 5/0278 428/315.5 |

(Continued)

FOREIGN PATENT DOCUMENTS

| | | |
|---|---|---|
| CN | 101517437 A | 8/2009 |
| CN | 105143924 A | 12/2015 |

(Continued)

*Primary Examiner* — Bao-Luan Q Le

(57) ABSTRACT

A wavelength conversion element includes a substrate, a wavelength conversion layer and an anti-reflective layer. The wavelength conversion layer is disposed on the substrate. The anti-reflective layer is disposed on the wavelength conversion layer. The anti-reflective layer includes a first adhesive layer having a plurality of pores. A thickness of the anti-reflective layer is 500 nm to 3000 nm, a pore diameter of each of the plurality of pores is 100 nm to 2500 nm, and the thickness of the anti-reflective layer is greater than the pore diameter of the plurality of pores. A manufacturing method of the aforementioned wavelength conversion element is also provided, through which the wavelength conversion element has the anti-reflective effect.

10 Claims, 3 Drawing Sheets

(56) References Cited

U.S. PATENT DOCUMENTS

| | | | |
|---|---|---|---|
| 2003/0123150 A1* | 7/2003 | Brickey | G02B 5/0242 359/599 |
| 2011/0304830 A1* | 12/2011 | Kato | G03B 21/204 353/84 |
| 2013/0056775 A1* | 3/2013 | Kawakami | G02F 1/00 257/98 |
| 2013/0181593 A1* | 7/2013 | Shikata | G02B 5/0284 313/46 |
| 2013/0194668 A1* | 8/2013 | Liang | C03C 1/008 359/586 |
| 2013/0194670 A1* | 8/2013 | Liang | C23C 18/1245 359/601 |
| 2013/0196139 A1* | 8/2013 | Lewis | C03C 1/008 428/312.6 |
| 2013/0196140 A1* | 8/2013 | Lewis | C03C 1/008 428/312.6 |
| 2013/0209678 A1* | 8/2013 | Sun | B05D 5/061 427/165 |
| 2013/0215513 A1* | 8/2013 | Liang | C23C 18/122 359/601 |
| 2013/0216807 A1* | 8/2013 | Wakefield | G02B 1/111 428/218 |
| 2014/0037841 A1* | 2/2014 | Jewhurst | G02B 1/113 427/164 |
| 2014/0232707 A1* | 8/2014 | Alschinger | G03B 21/2053 345/207 |
| 2015/0132479 A1* | 5/2015 | Arfsten | C01B 33/143 427/164 |
| 2016/0025899 A1* | 1/2016 | Ishizeki | C01B 33/18 428/141 |
| 2016/0040857 A1* | 2/2016 | Inoue | F21V 9/32 362/343 |
| 2016/0061391 A1* | 3/2016 | Inoue | F21V 13/14 362/84 |
| 2016/0091632 A1* | 3/2016 | Shimatsu | G02B 1/14 359/581 |
| 2016/0266375 A1* | 9/2016 | Li | G02B 26/008 |
| 2017/0052362 A1 | 2/2017 | Chou et al. | |
| 2017/0235127 A1* | 8/2017 | Sprague | G02B 26/008 362/84 |
| 2018/0231880 A1* | 8/2018 | Masuda | G03B 21/2066 |
| 2018/0252843 A1* | 9/2018 | Kuo | G02B 26/008 |
| 2019/0072694 A1* | 3/2019 | Kitamoto | G02B 5/0242 |
| 2019/0187545 A1* | 6/2019 | Arakawa | G03B 21/208 |
| 2019/0294033 A1* | 9/2019 | Yokoo | G03B 21/16 |
| 2019/0377173 A1* | 12/2019 | Sprague | F21V 13/08 |

FOREIGN PATENT DOCUMENTS

| | | |
|---|---|---|
| CN | 106461811 A | 2/2017 |
| CN | 108538990 A | 9/2018 |
| TW | 201544894 A | 12/2015 |
| WO | 2015049406 A1 | 4/2015 |

* cited by examiner

WAVELENGTH CONVERSION ELEMENT HAVING ANTI-REFLECTIVE LAYER WITH PORES AND MANUFACTURING METHOD THEREOF

CROSS-REFERENCE TO RELATED APPLICATION

THIS APPLICATION CLAIMS THE PRIORITY BENEFIT OF CHINA APPLICATION SERIAL NO. 201910383324.0, FILED ON May 9, 2019. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an optical element, and more particularly to a wavelength conversion element and a manufacturing method thereof.

BACKGROUND OF THE INVENTION

The type of light source used in the projection device evolves from ultra-high pressure mercury (UHP) lamp and light emitting diode (LED) to the laser diode (LD) source as the market demands for brightness, color saturation, service life, non-toxicity and environmental protection (Restriction of Hazardous Substances (RoHS), for example) of the projection device.

Currently, the high-brightness red laser diodes and green laser diodes cost too much. In order to reduce the cost, blue laser diodes are usually used to excite the phosphor on the phosphor wheel to generate yellow light and green light, and then the required red light is filtered through a filter wheel. Together with the blue light emitted by the blue laser diode, the three primary colors of red, green and blue, which are required for the projection image, are formed.

The phosphor wheel is an extremely important component in projection apparatus that currently use laser diodes as a light source. In a prior-art phosphor wheel, the surface of the phosphor layer is coated with an optical dielectric coating to reduce the reflection of incident light on the surface of the phosphor layer. However, depending on the wavelength of the incident light, it is necessary to dispose a multi-layer coating to achieve a good anti-reflective effect. In addition to the manufacturing cost, there are other problems such as relative film thickness control, thermal matching, coating adhesion, film thickness unevenness, and poor coating drape in the manufacturing process.

The anti-reflective effect can also be achieved by imprinting microstructures such as cones, cylinders, pyramids or prism on the anti-reflective layer. However, the microstructure of an anti-reflective layer often requires a mold having microstructure pattern in the manufacturing process to imprint the microstructure on the anti-reflective layer via a rolling-over process. Therefore, there are problems such as service life of mold and microstructure stained with film.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion component, which can improve the anti-reflective effect and increase the luminous flux.

The invention provides a manufacturing method of a wavelength conversion component, through which the wavelength conversion component can improve the anti-reflective effect and increase the luminous flux.

Other advantages and objects of the invention may be further illustrated by the technical features broadly embodied and described as follows.

In order to achieve one or a portion of or all of the objects or other objects, an embodiment of the invention provides a wavelength conversion element, which includes a substrate, a wavelength conversion layer and an anti-reflective layer. The wavelength conversion layer is disposed on the substrate. The anti-reflective layer is disposed on the wavelength conversion layer. The anti-reflective layer includes a first adhesive layer having a plurality of pores. A thickness of the anti-reflective layer is 500 nm to 3000 nm, a pore diameter of each of the plurality of pores is 100 nm to 2500 nm, and the thickness of the anti-reflective layer is greater than the pore diameter of the plurality of pores.

In order to achieve one or a portion of or all of the objects or other objects, an embodiment of the invention provides a manufacturing method of a wavelength conversion element, which includes steps of: forming a wavelength conversion layer on a substrate; and forming an anti-reflective layer on the wavelength conversion layer, which includes steps of: disposing a first adhesive and a plurality of polymer particles on the wavelength conversion layer, wherein the plurality of polymer particles is mixed with the first adhesive; and removing the plurality of polymer particles, so that the first adhesive forms a first adhesive layer having a plurality of pores, wherein a thickness of the anti-reflective layer is 500 nm to 3000 nm, a pore diameter of each of the plurality of pores is 100 nm to 2500 nm, and the thickness of the anti-reflective layer is greater than the pore diameter of the plurality of pores.

In summary, the wavelength conversion element of the embodiment of the invention includes an anti-reflective layer disposed on a wavelength conversion layer, and the anti-reflective layer includes a first adhesive layer having a plurality of pores. These pores increase the area of the light-receiving surface, that is, the surface area of the porous solid material per unit mass, thereby increasing the luminous flux and enhancing the anti-reflective effect. Further, the above effects and advantages can be further enhanced by designing the thickness of the anti-reflective layer to 500 nm to 3000 nm and the pore diameter of each of the pores to 100 nm to 2500 nm. The above-described wavelength conversion element can be manufactured by a manufacturing method of a wavelength conversion element according to the embodiment of the invention in which the polymer particles are used to make pores.

Other objectives, features and advantages of the invention will be further understood from the further technological features disclosed by the embodiments of the invention, wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
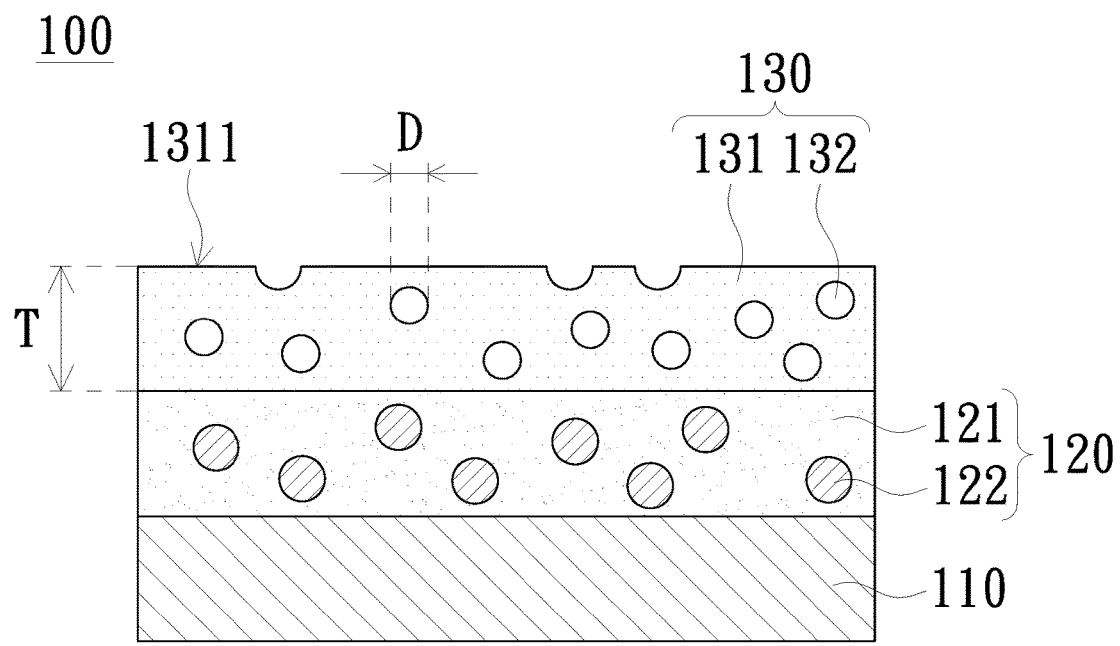
FIG. 1 is a schematic view of a wavelength conversion element according to an embodiment of the invention.

FIG. 1 is a schematic view of a wavelength conversion element according to an embodiment of the invention. Referring to FIG. 1, the wavelength conversion element 100 of the embodiment includes a substrate 110, a wavelength conversion layer 120 and an anti-reflective layer 130. The wavelength conversion layer 120 is disposed on the substrate 110. The anti-reflective layer 130 is disposed on the wavelength conversion layer 120. The wavelength conversion element 100 is, for example, a sheet-shaped element, but is not limited thereto. In other embodiments, the wavelength conversion element 100 may also be a wavelength conversion wheel, and the substrate 110 is, for example, a turntable.

The material of the substrate 110 is, for example, a metal, a ceramic, or the like, but is not limited thereto. The material of the substrate 110 may be other materials capable of achieving a heat dissipation effect.

The anti-reflective layer 130 includes a first adhesive layer 131 having a plurality of pores 132. The material of the first adhesive layer 131 is, for example, inorganic glue, glass glue or the like, but is not limited thereto. The shape of the pores 132 includes, for example, a spherical shape or a polyhedral shape, but is not limited thereto. The first adhesive layer 131 further has, for example, a first surface 1311 away from the wavelength conversion layer 120. The pores 132 are distributed in the first adhesive layer 131 and on the first surface 1311. Taking the pores 132 having a spherical shape as an example, specifically, the pore 132 in the first adhesive layer 131 is spherical hole, and the pore 132 on the first surface 1311 is partial spherical hole (as shown in FIG. 1). As a whole, the porosity of the anti-reflective layer 130 is preferably between 50% and 80%.

Specifically, the anti-reflective layer 130 may be designed to have a different thickness T depending on various factors such as manufacturing capability, adhesive characteristics, incident light wavelength range, and light transmission degradation to achieve an optimum anti-reflective effect. The thickness T of the anti-reflective layer 130 of the invention can be designed to, for example, 500 nm to 3000 nm. Further, in order to eliminate the reflection at the interface, the thickness T of the anti-reflective layer 130 is preferably an odd multiple of ¼ wavelength of incident light (not shown). The pore diameter D of each of the pores 132 is, for example, 100 nm to 2500 nm, preferably 100 nm to 500 nm. Further, in order to reduce the surface reflection of the pores 132, the pore diameter D is preferably smaller than the incident light wavelength, and the pore diameter D of the pores 132 is smaller than the thickness T of the anti-reflective layer 130.

The wavelength conversion layer 120 includes a second adhesive layer 121 and a plurality of wavelength conversion particles 122. The wavelength conversion particles 122 are disposed in the second adhesive layer 121. The material of the second adhesive layer 121 is, for example, inorganic glue, but is not limited thereto. In an embodiment, the second adhesive layer 121 may also use the same material as the first adhesive layer 131. The wavelength conversion particles 122 are, for example, phosphors or quantum dots, but are not limited thereto.

The wavelength conversion element 100 of the embodiment includes the anti-reflective layer 130 disposed on the wavelength conversion layer 120, and the anti-reflective layer 130 includes the first adhesive layer 131 having the pores 132. The pores 132 can increase the area of the light-receiving surface (specific surface area, for example) of the wavelength conversion element 100 to enhance the anti-reflective effect. Further, the above effects and advantages can be further enhanced by the design ranges of the thickness T of the anti-reflective layer 130 and the size of the pore diameter D of the pores 132.

The wavelength conversion layer 120 of the wavelength conversion element 100 has, for example, a first refractive index, and the anti-reflective layer 130 has, for example, a second refractive index. The first refractive index and the second refractive index have the following relationship: 1<the second refractive index≤the first refractive index, wherein the refractive index of air is 1. In the case where the above relationship is satisfied, the wavelength conversion element 100 can avoid the loss of luminous flux due to the excessive difference between the first refractive index and the second refractive index. In other words, the luminous flux is increased and the anti-reflective effect is achieved.

Figure 2:
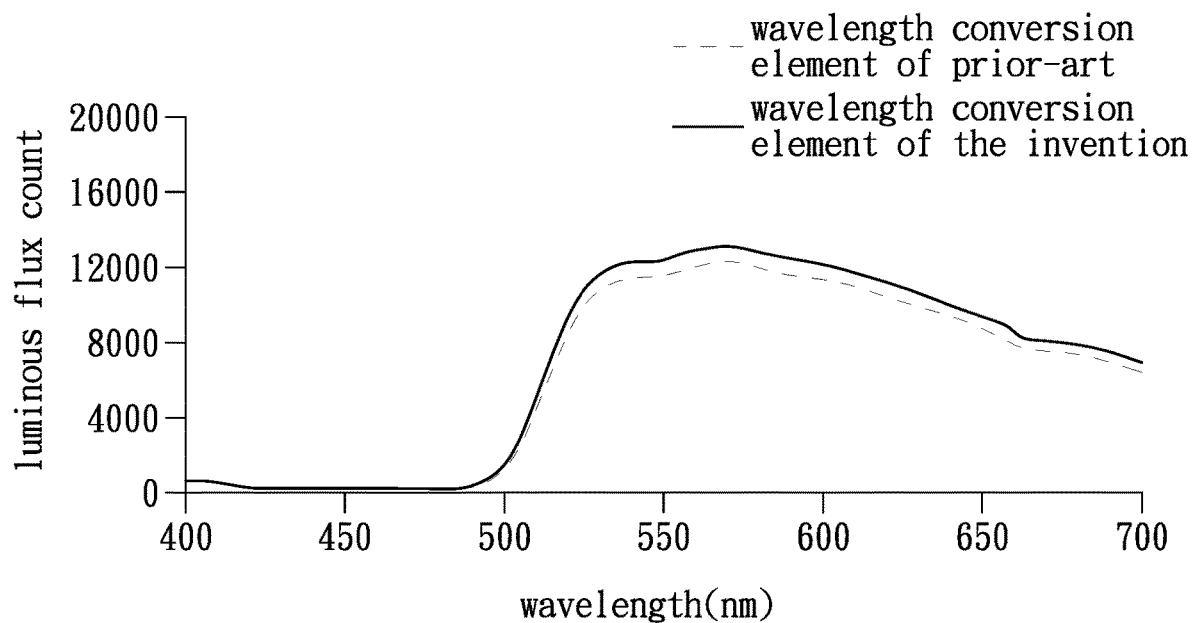
FIG. 2 is a view showing a comparison of luminous fluxes between a wavelength conversion element according to an embodiment of the invention and a prior-art wavelength conversion element.

FIG. 2 is a view showing a comparison of luminous fluxes between a wavelength conversion element according to an embodiment of the invention and a prior-art wavelength conversion element. In FIG. 2, the vertical axis is the luminous flux count and the horizontal axis is the wavelength range of visible light (400 nm to 700 nm). The wavelength conversion element 100 of the embodiment includes the anti-reflective layer 130, thus, the luminous flux is increased by 15% to 20% in the wavelength range of visible light, compared to the prior-art wavelength conversion element.

Figure 3:
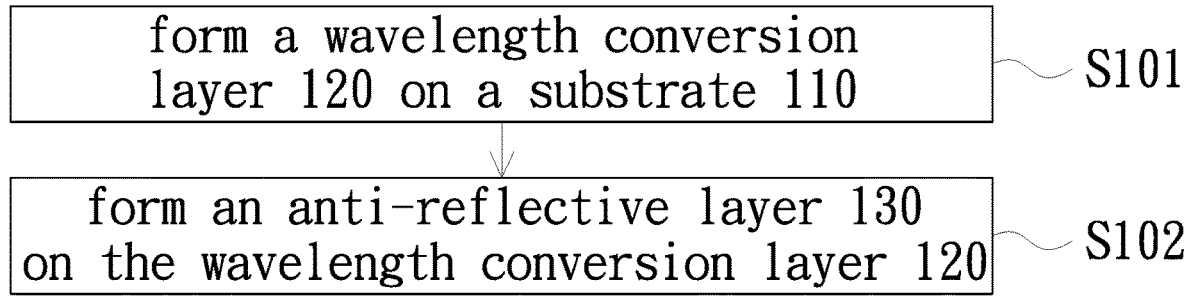
FIG. 3 is a flow chart showing a manufacturing method of a wavelength conversion element according to an embodiment of the invention.

FIG. 3 is a flow chart showing a manufacturing method of a wavelength conversion element according to an embodiment of the invention. Referring to FIGS. 1 and 3, the manufacturing method of a wavelength conversion element 100 of the embodiment includes the following steps. Step S101: form a wavelength conversion layer 120 on a substrate 110. Specifically, the wavelength conversion layer 120 is, for example, coated or printed on the substrate 110 first, and then the wavelength conversion layer 120 is cured at a high temperature. In another embodiment, the wavelength conversion layer 120 may be first cured and then bonded to the substrate 110.

Step S102: form an anti-reflective layer 130 on the wavelength conversion layer 120. Specifically, a first adhesive and a plurality of polymer particles are first disposed on the wavelength conversion layer 120. More specifically, the polymer particles are mixed with the first adhesive and the mixed polymer particles and the first adhesive are coated or sprayed on the wavelength conversion layer 120. The first adhesive of the embodiment is, for example, glass glue, but is not limited thereto, and may be another type of inorganic glue.

Then, the polymer particles are removed. The method of removing the polymer particles is, for example, heating the first adhesive and the polymer particles coated or sprayed on the wavelength conversion layer 120 at a temperature to cleave the polymer particles to leave pores, and then curing the first adhesive to form a first adhesive layer 131 having a plurality of pores 132. In the embodiment, the temperature for heating the first adhesive is mainly based on the temperature at which the polymer particles are cleavable without causing the wavelength conversion layer 120 and the first adhesive to soften, for example, 300 degrees or 400 degrees, but the invention is not limited thereto. In another embodiment, the method of removing the polymer particles is, for example, first curing the first adhesive at a lower temperature and then heating the polymer particles at a higher temperature to leave the pores. It should be noted that the above steps and step numbers are only for explaining the contents of each step, and are not intended to limit the order of the manufacturing process. Those skilled in the art may change different manufacturing orders according to the manufacturing requirements, such as forming the anti-reflective layer 130 on the wavelength conversion layer 120 first and then forming the wavelength conversion layer 120 on the substrate 110.

By designing the thickness T of the anti-reflective layer 130 to 500 nm to 3000 nm, the pore diameter D of each of the pores 132 to 100 nm to 2500 nm, and the thickness T of the anti-reflective layer 130 greater than the pore diameter D of the pores 132 when the wavelength conversion element 100 is manufactured, the anti-reflective effect and the increase of the luminous flux may be further improved.

Figure 4:
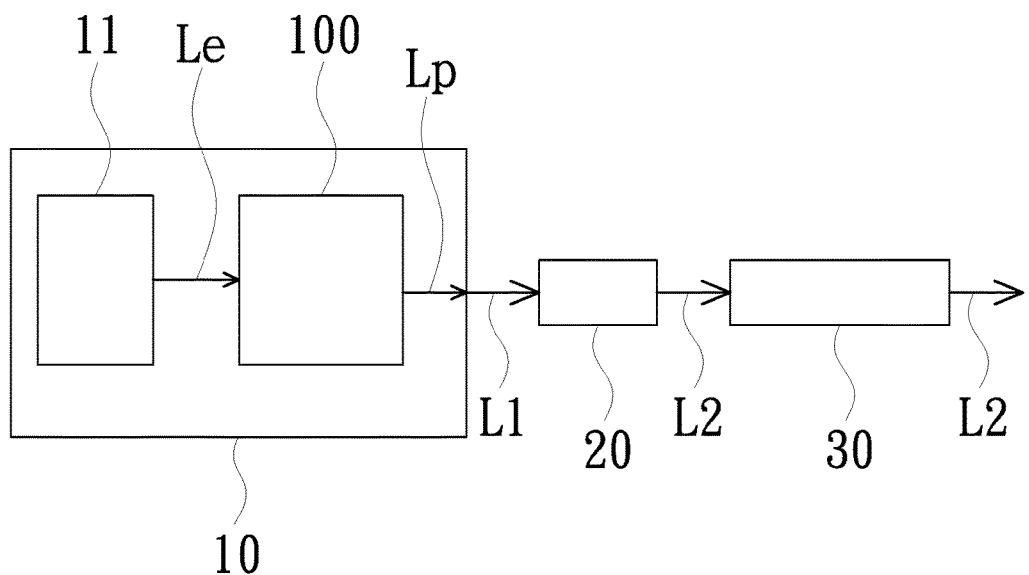
FIG. 4 is a schematic block diagram of a projection apparatus according to an embodiment of the invention.

The wavelength conversion element 100 of the embodiment can be applied, for example, to various optical devices. Hereinafter a projection apparatus will be taken as an example, but is not intended to limit the invention. FIG. 4 is a schematic block diagram of a projection apparatus according to an embodiment of the invention. Referring to FIG. 4, the projection apparatus 1 of the embodiment includes an illumination system 10, a light valve 20, and a projection lens 30. The illumination system 10 is used to provide an illumination beam L1 to the light valve 20. The illumination system 10 includes an excitation light source 11 and a wavelength conversion element 100. In the embodiment, the wavelength conversion element 100 is, for example, a wavelength conversion wheel, in which the substrate 110 is, for example, a turntable, but the invention is not limited thereto. The excitation light source 11 is used to provide an excitation beam Le. The wavelength conversion element 100 is disposed on a transmission path of the excitation beam Le and is used to convert the excitation beam Le. The wavelength conversion element 100 may have a wavelength conversion region (not shown) and a wavelength maintenance region (not shown), or only have a wavelength conversion region. The wavelength conversion region is provided with a wavelength conversion layer 120 and an anti-reflective layer 130 and is used to convert the excitation beam Le into a converted beam Lp. The wavelength maintenance region is used to allow the excitation beam Le to pass therethrough or reflect the excitation beam Le. As such, the illumination beam L1 includes the excitation beam Le and/or the converted beam Lp, but is not limited thereto.

In other embodiments, the illumination system 10 may further include other optical components, such as a light combining component, a filter wheel, a light homogenizing component, and a light concentrating lens, to transmit the illumination beam L1 to the light valve 20.

The light valve 20 is disposed on the transmission path of the illumination beam L1 to convert the illumination beam L1 into an image beam L2. The light valve 20 can be a transmissive light valve or a reflective light valve. The transmissive light valve can be a liquid crystal display panel, and the reflective light valve can be a digital micro-mirror device (DMD), a liquid crystal display (LCD), a liquid crystal on silicon (LCoS) panel, a transparent liquid crystal panel, an electro-optical modulator, a magneto-optical modulation, an acousto-optic modulator (AOM), but are not limited thereto. The number of light valves 20 may be one or more depending on the design architecture.

The projection lens 30 is disposed on the transmission path of the image beam L2 and is used to project the image beam L2 out of the projection apparatus 1. The projection lens 30 includes, for example, a combination of one or more optical lenses having diopter, such as various combinations of non-planar lenses including biconcave lenses, lenticular lenses, meniscus lenses, convex-concave lenses, plano-convex lenses, and plano-concave lenses. In an embodiment, the projection lens 30 may also include a planar optical lens.

Figure 5:
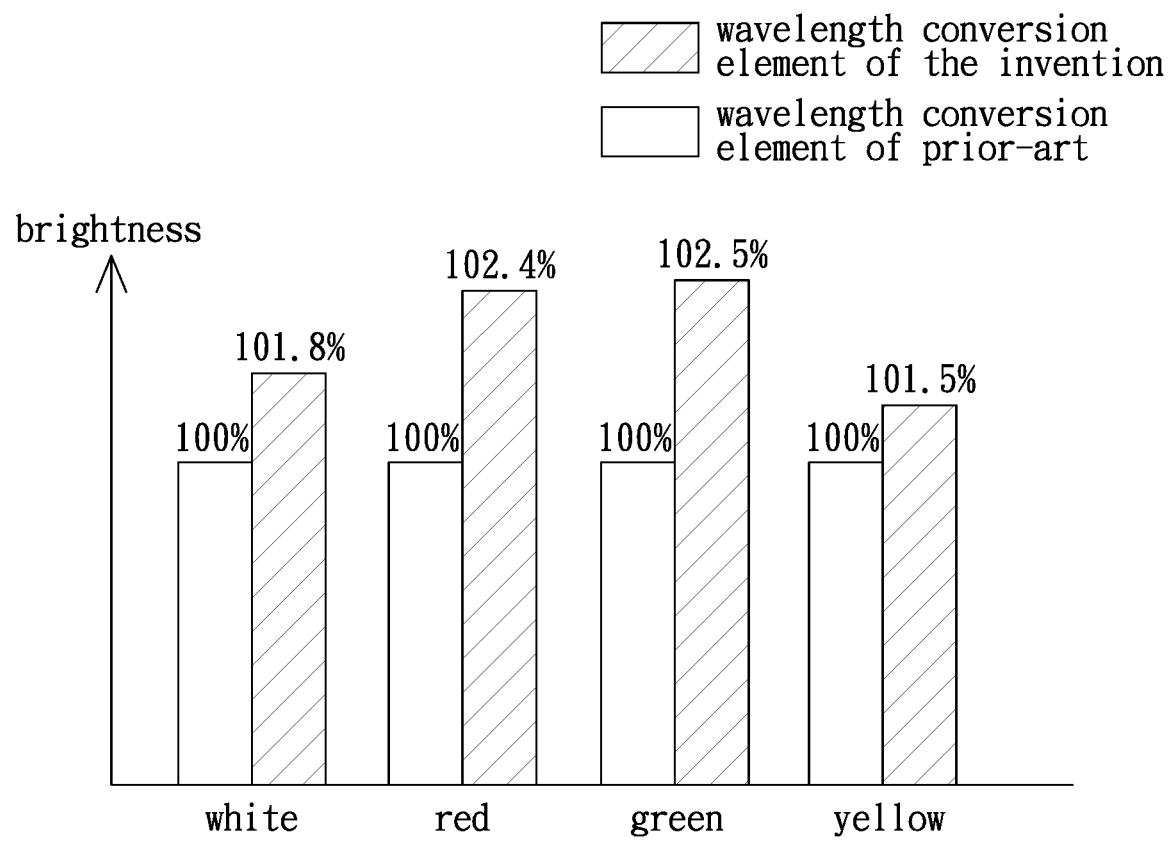
FIG. 5 is a view showing a comparison of brightness of image beams between a wavelength conversion element according to an embodiment of the invention and a prior-art wavelength conversion element, wherein the image beam is used in a projection apparatus.

In the embodiment, the image brightness can be improved due to the projection apparatus 1 uses the wavelength conversion element 100 having an anti-reflective effect and an increased luminous flux. Referring to FIGS. 4 and 5, FIG. 5 is a view showing a comparison of brightness of image beams between a wavelength conversion element according to an embodiment of the invention and a prior-art wavelength conversion element, wherein the image beam is projected by a projection apparatus. The wavelength conversion element of the embodiment and the prior-art wavelength conversion element are tested by lights of different colors. On average, the projection apparatus using the wavelength conversion element 100 of the embodiment of the invention can increase the brightness of each color by 1.5%, compared with the projection apparatus using the prior-art wavelength conversion element.

In summary, the wavelength conversion element of the embodiment of the invention includes an anti-reflective layer disposed on a wavelength conversion layer, and the anti-reflective layer includes a first adhesive layer having a plurality of pores. These pores increase the area of the light-receiving surface, that is, the surface area of the porous solid material per unit mass, thereby increasing the luminous flux and enhancing the anti-reflective effect. Further, the above effects and advantages can be further enhanced by designing the thickness of the anti-reflective layer to 500 nm to 3000 nm and the pore diameter of each of the pores to 100 nm to 2500 nm. The above-described wavelength conversion element can be manufactured by a manufacturing method of a wavelength conversion element according to the embodiment of the invention in which the polymer particles are used to make pores.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion element, comprising a substrate, a wavelength conversion layer and an anti-reflective layer, wherein:
    the wavelength conversion layer is disposed on the substrate; and
    the anti-reflective layer is disposed on the wavelength conversion layer, and the anti-reflective layer comprises a first adhesive layer having a plurality of pores,
    wherein a thickness of the anti-reflective layer is 500 nm to 3000 nm, a pore diameter of each of the plurality of pores is 100 nm to 2500 nm, and the thickness of the anti-reflective layer is greater than the pore diameter of the plurality of pores,
    wherein the plurality of pores are distributed in the first adhesive layer and on a first surface, the first surface is facing away from the wavelength conversion layer.

2. The wavelength conversion element according to claim 1, wherein the first adhesive layer comprises glass glue.

3. The wavelength conversion element according to claim 1, wherein the wavelength conversion layer comprises a second adhesive layer and a plurality of wavelength conversion particles, and the plurality of wavelength conversion particles are disposed in the second adhesive layer.

4. The wavelength conversion element according to claim 1, wherein a shape of the plurality of pores comprises a spherical shape or a polyhedral shape.

5. The wavelength conversion element according to claim 1, wherein a porosity of the anti-reflective layer is 50% to 80%.

6. The wavelength conversion element according to claim 1, wherein the wavelength conversion element is a wavelength conversion wheel, and the substrate is a turntable.

7. A manufacturing method of a wavelength conversion element, comprising steps of:
    forming a wavelength conversion layer on a substrate; and
    forming an anti-reflective layer on the wavelength conversion layer, comprising steps of:
        disposing a first adhesive and a plurality of polymer particles on the wavelength conversion layer, wherein the plurality of polymer particles are mixed with the first adhesive; and
        removing the plurality of polymer particles, so that the first adhesive forms a first adhesive layer having a plurality of pores, wherein a thickness of the anti-reflective layer is 500 nm to 3000 nm, a pore diameter of each of the plurality of pores is 100 nm to 2500 nm, and the thickness of the anti-reflective layer is greater than the pore diameter of the plurality of pores.

8. The manufacturing method of a wavelength conversion element according to claim 7, wherein the step of disposing the first adhesive and the plurality of polymer particles on the wavelength conversion layer comprises: mixing the first adhesive and the plurality of polymer particles and coating or spraying the first adhesive and the plurality of polymer particles mixed with each other on the wavelength conversion layer.

9. The manufacturing method of a wavelength conversion element according to claim 7, wherein the step of removing the plurality of polymer particles comprises: heating the first adhesive and the plurality of polymer particles to cleave the plurality of polymer particles.

10. The manufacturing method of a wavelength conversion element according to claim 7, wherein the first adhesive comprises glass glue.

* * * * *